Dec. 28, 1937.　　　　　J. MUCHA　　　　　2,103,295
ANTISKIDDING DEVICE FOR MOTOR VEHICLES
Filed Feb. 27, 1937　　　2 Sheets-Sheet 1
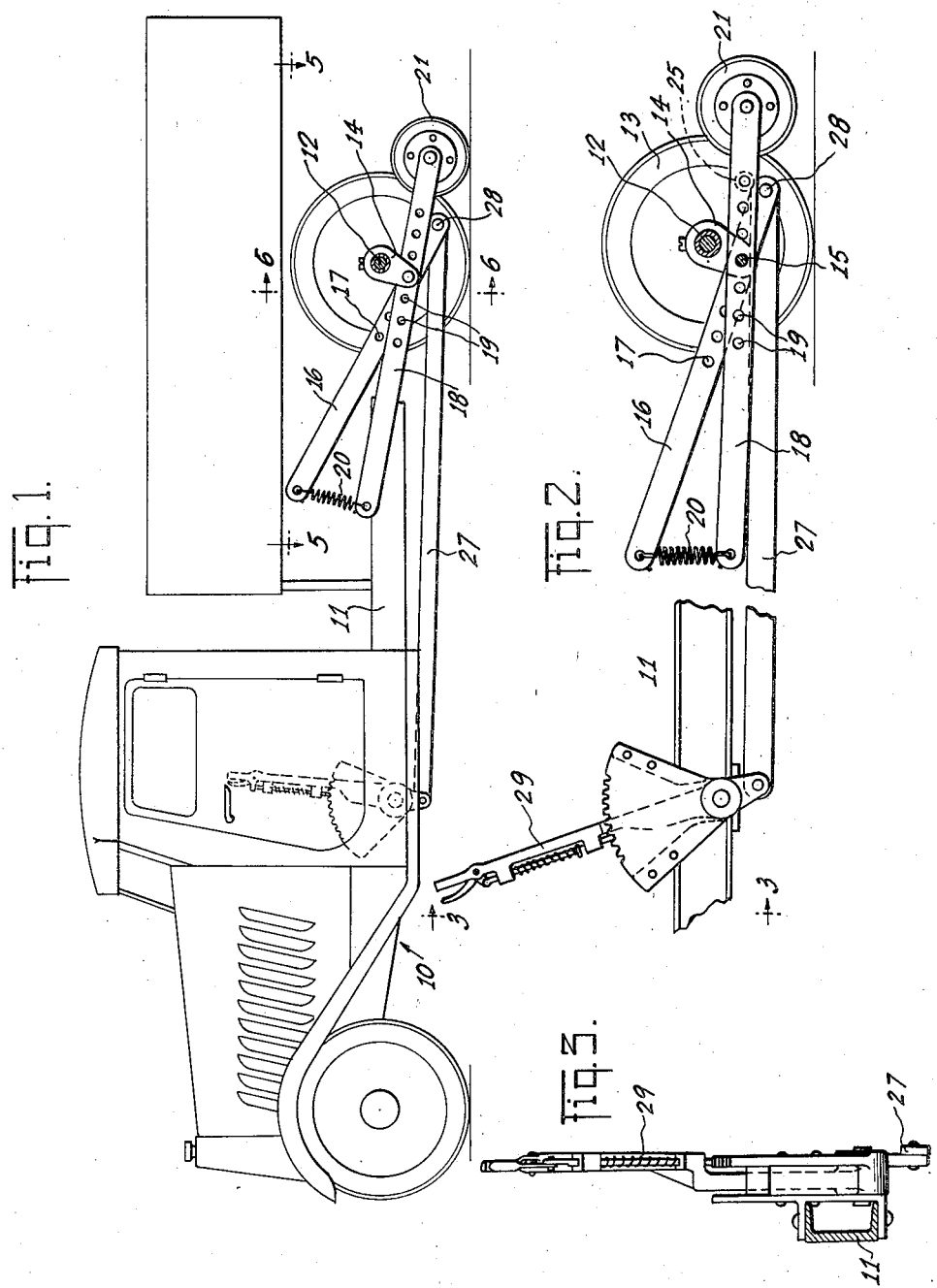
INVENTOR.
J. MUCHA
BY
F. Ledermann
ATTORNEY.

Dec. 28, 1937. J. MUCHA 2,103,295
ANTISKIDDING DEVICE FOR MOTOR VEHICLES
Filed Feb. 27, 1937 2 Sheets-Sheet 2
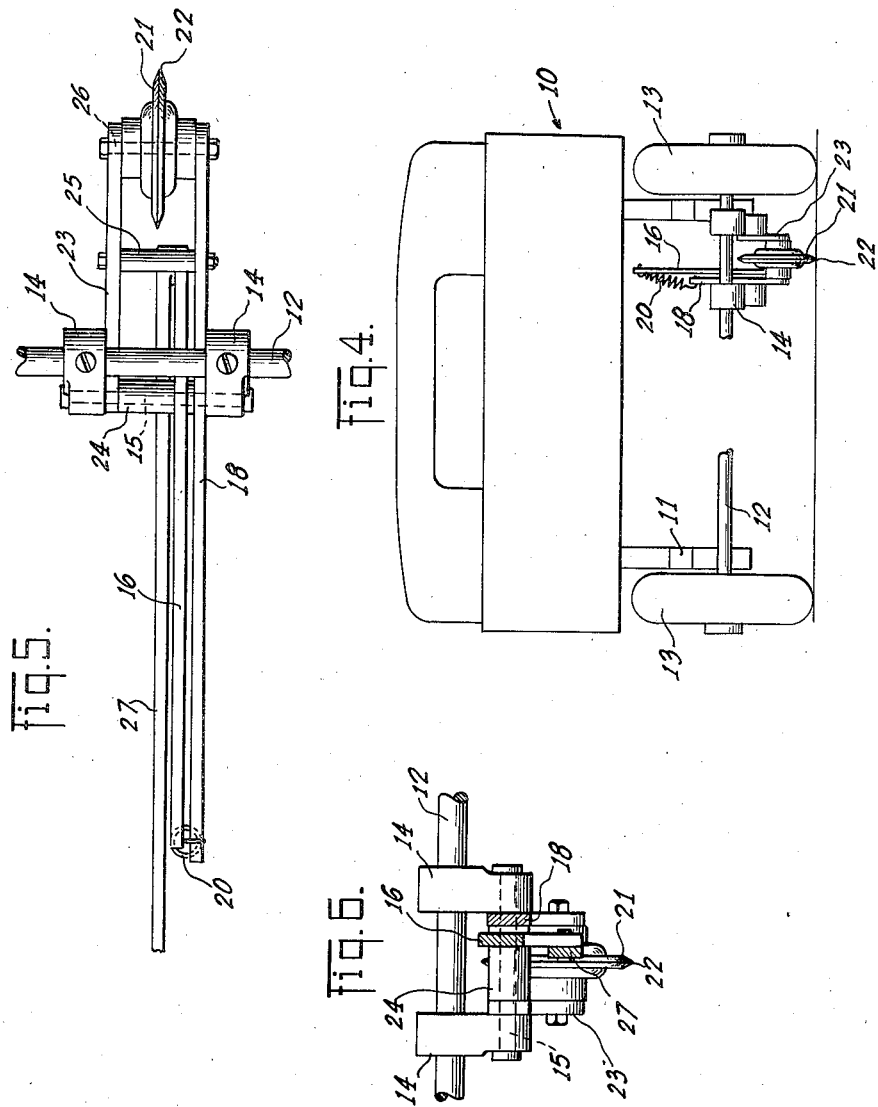
INVENTOR.
J. MUCHA.
BY J. Ledermann
ATTORNEY.

Patented Dec. 28, 1937

2,103,295

UNITED STATES PATENT OFFICE 2,103,295

ANTISKIDDING DEVICE FOR MOTOR VEHICLES

Joseph Mucha, Neenah, Wis.

Application February 27, 1937, Serial No. 128,122

1 Claim. (Cl. 188—5)

The main object of this invention is the provision of an improved efficient device adapted to be applied to motor vehicles to serve the purpose of preventing skidding of the vehicle on icy roads, the device being simple in construction and operation and being suitable for mounting on new vehicles at the time of construction, as well as on vehicles already in service.

The above and other objects will become apparent in the description below, in which characters of reference refer to like-named parts in the accompanying drawings.

Referring briefly to the drawings, Figure 1 is a side elevational view of a motor truck, with parts broken away, illustrating the device in operative position.

Figure 2 is a fragmentary view similar to Figure 1, but showing only the essential elements of the vehicle and the device, with the latter in inoperative or idle position.

Figure 3 is a cross-sectional view taken on the line 3—3 of Figure 2.

Figure 4 is a rear elevational view of Figure 1.

Figure 5 is a cross-sectional view taken on the line 5—5 of Figure 1.

Figure 6 is a cross-sectional view taken on the line 6—6 of Figure 1.

Referring in detail to the drawings, the numeral 10 indicates a motor vehicle having a chassis frame 11 and the rear axle housing 12 in which the shafts of the wheels 13 are mounted.

A pair of spaced-apart arms 14 are locked by means of screws or the like, on the housing 12 and extend diagonally forward and downward of the housing. A pin 15 is rigidly supported in the extremities of the arms 14. A lever 16 having a plurality of holes 17 at one end is pivotally mounted on the pin 15 by passage of the latter through one of the holes 17. Adjacent thereto, a second lever 18 similarly provided with a plurality of holes 19 is likewise pivotally mounted on the pin 15 by passage of the latter through one of the holes 19. The forward ends of the levers 16 and 18 are joined by a stout spring 20.

At the opposite ends of the link 18, a wheel 21 having a relatively sharp tapered periphery 22, is rotatably mounted in the following manner. A frame member 23 is pivoted on the pin 15 between the sleeve 24 surrounding the latter, and the arm 14 adjacent the wheel 13. The member 23 is held in parallel relationship with the projection of the lever 18 rearward of the pin 15 by means of a brace 25. A shaft 26 further braces the member 23 against the lever 18 at the extremities of both of these members. The wheel 21 is mounted on the shaft 26.

A link 27 has one end pivotally mounted in the hole 28 at the extremity of the lever 16. The forward end of the link 27 is pivoted to the lower end of a handle 29. The construction of the latter is similar to that of emergency brake handles on motor vehicles and need not be further described.

In inactive position, the relative parts are shown in Figure 2, with the handle 29 tilted forward. When it is desired to actuate the device to prevent skidding on an icy road, the handle 29 is pulled rearward by the driver. Thus the lever 16 is rotated in a clockwise direction, and through the medium of the spring 20 the left-hand end (Figure 2) of the lever 18 is likewise rotated in the same direction so as to bring the wheel 21 downward in contact with the road. The spring 20 serves to permit gradually increasing pressure of contact of the wheel 21 against the road, which is desirable, as too sudden contact might result in causing the vehicle to swerve or to be checked too rapidly. To restore the device to inoperative position, the brake handle 29 is released and moved forward, causing the reverse movement of the various parts of the device. To facilitate lifting of the wheel 21 from the road, or in other words, counter-clockwise rotation of the lever 18 on the pin 15 during this operation, the brace 25 lies in the orbit of the pin end 28 of the lever 16. Thus, as the brake handle 29 moves forward, the said end of the lever 16 engages the brace 25 and pushes the wheel end of the lever 18 upward. When the device is in inactive position, the wheel 21 is clear of the road but may be quickly brought downward to contact with the road when the vehicle passes over an icy section.

In order to vary the amount of force exerted by the wheel 21 against the road, the plurality of holes 17 and 19 have been provided in the levers 16 and 18, respectively. It is apparent that by shifting the engagement of the pin 15 from one of these holes on either lever to another, the mechanical ratios may be varied as desired.

Obviously, modifications in form and structure may be made without departing from the spirit and scope of the invention.

I claim:

In a motor vehicle, a pin rigid with the body of the vehicle between the rear wheels, a lever pivotally mounted on said pin, a second lever adjacent thereto pivotally mounted on said pin, one of said levers having a longer projection rearward from said pin and having a wheel mounted in the end thereof, the shorter of said levers having a link pivotally mounted in the rearwardly projecting end thereof, a spring joining the forward ends of said levers, handle connected with said link and adapted to move said link in a substantially horizontal direction, movement of said link in one direction causing said wheel to be urged downward against the road, and movement in the opposite direction causing said wheel to be lifted above the road.

JOSEPH MUCHA.